Jan. 31, 1967    A. J. BOUTHILLER    3,301,521

VALVE ASSEMBLY

Filed Jan. 28, 1964

United States Patent Office

3,301,521
Patented Jan. 31, 1967

1

3,301,521
VALVE ASSEMBLY
Auguste J. Bouthiller, Worcester, Mass., assignor to Imperial Machine Corporation, Worcester, Mass., a corporation of Massachusetts
Filed Jan. 28, 1964, Ser. No. 340,620
1 Claim. (Cl. 251—31)

This invention relates to valves and especially to valves for connecting a machine or mechanism with a source of fluid for its operation, or for supplying or controlling the flow of fluid used in industrial processes, and has for its principal objects to provide a control valve comprised of relatively few component parts; to provide a valve in which the component parts are so designed as to require only the simplest machining operations in their manufacture; to provide a valve comprised of components which can be readily assembled; to provide a valve which is dependable; to provide a mechanically-operable valve which operates without loss of pressure; to provide a valve in which there are starting means for reversing the position of the valve which serve only to initiate positioning of the valve in one position or the other, the position of the valve at any given time being maintained by the operating pressure so as to be independent of the starting means and therefore particularly useful in complex sequence operation; and to provide a valve which operates efficiently at pressures of 5 to 150 p.s.i.

As herein illustrated, the valve assembly has in combination with a valve element movable relatively to spaced ports to connect the same, a spool or piston operable to effect shifting of the valve element, and an elongate chamber within which the spool is freely slidable. The chamber contains a port intermediate its ends through which pressure is supplied thereto, exhaust ports at its ends through which the pressure within the chamber may be exhausted, and provisions for exhausting the chamber at the ends beyond the ends of the piston spool to unbalance the pressure at the ends sufficiently to shift the spool toward the end from which the pressure is exhausted. It is characteristic of the invention that the ends of the spool are uniformly flat, that the ends of the chamber are correspondingly uniformly flat, and that there are elastically deformable O-rings mounted on the flat ends of the chamber or on the flat ends of the spool operative, by compression between the ends of the chamber and spool, to close the exhaust ports. Flanges at the ends of the spool slidably support the spool in the chamber and provide, in combination with the portion of the spool intermediate the flanges, an annular chamber which is in communication with the inlet port, portions at the ends of the chamber beyond the ends of the spool which are in communication with the exhaust ports, and contain bleeder passages connecting the portion of the chamber between the flanges to the portions of the chamber beyond the flanges. Preferably the flat ends of the chamber or spool contain circular grooves, concentric with the exhaust ports, of substantially half-circular cross-section within which the O-rings are seated and secured as by peening. The closures for the exhaust ports, in one form of the invention, comprise conical seats with which the ends of right-cylindrical parts of an elastomer are yieldingly held.

The invention will now be described in greater detail with reference to the accompanying drawings wherein.

2

Figure 4:
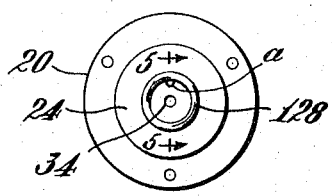
FIG. 4 is an elevation of the inner end of one of the end blocks showing an O-ring.
Figure 6:
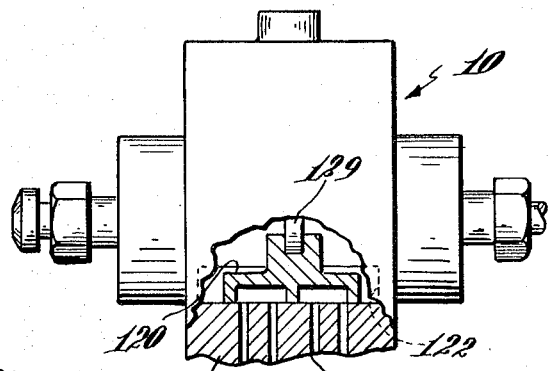
Figures 5, 8:
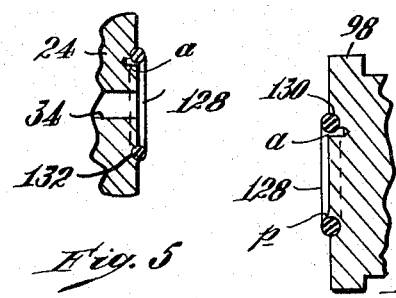
Figure 7:

FIG. 5 is an enlarged fragmentary section taken on the line 5—5 of FIG. 4, showing the groove within which is seated a sealing ring;

FIG. 6 is an elevation of a valve assembly, partly in section, showing an alternative form of valve element;

FIG. 7 is an enlarged fragmentary section of one end of the spool showing the O-ring mounted thereon concentric with its axis; and FIG. 8 is a fragmentary section of an alternative form of closure.

The valve assembly has in one form a body 10, herein shown as a block of metal of hexagonal cross-section, having flat side faces 12a to 12f and end faces 14 and 16. The kind of metal employed is important only in so far as it is compatible with the use of the valve and the shape and size will be dictated by manufacturing costs and use.

The body 10 contains lengthwise thereof, that is, parallel to the side faces, a cylindrical bore forming a chamber 18. The ends of the chamber 18 are covered by blocks 20 and 22 secured to the end faces 14 and 16 by bolts 28. The blocks have cylindrical bosses 24 and 26 at their inner sides which fit into the open end of the cylindrical chamber. The inner faces of the bosses are ground flat and in planes at right angles to the longitudinal axis of the chamber. Each block 20, 22 contains centrally thereof a threaded hole 30, 32 extending from its outer side part way through, and a small diameter exhaust port 34, 36 at the bottom extending the remainder of the way through to the interior of the chamber 18. Threaded plugs 38 and 40 are screwed into the blocks and have at their outer ends heads 42, 44 by means of which their position in the holes 30, 32 may be adjusted. Each plug contains a smooth axial bore 46, 48 part way through, a hole 50, 52 of smaller diameter at the inner end of the bore extending the remainder of the way through the plug, and a conical seat 54, 56 at the inner end concentric with the hole 50, 52. Closures C', C'' comprising stems 62, 64, having conical parts 58, 60 at their inner ends for engagement with the conical seats 54, 56, are slidably supported in the plugs with their outer ends fixed to buttons 66, 68 fitted into the bores 46, 48. Springs 70, 72 are disposed about the stems between the bottoms of the bores and the inner sides of the buttons and are operative to hold the conical parts seated. The stems 62, 64 are of smaller diameter than the bores 46, 48 and ports 74, 76 are provided in the walls of the plugs between the bottoms and the buttons which connect the ends of the chamber to the atmosphere when the parts 58, 60 are unseated.

A modified closure, only one of which is illustrated herein, since they are identical at oposite ends, is shown in FIG. 7 as comprising a stem 50 having at its inner end a circumferential groove 51 within which there is seated a cylindrical part 53 of right-circular section. A head 55 forms one side of the groove and one or more abutments 57 form the other side of the grove. The cylindrical part 53 is comprised of an elastomer such as neoprene and is assembled on the spindle by forcing it over the head 55.

Figure 1:
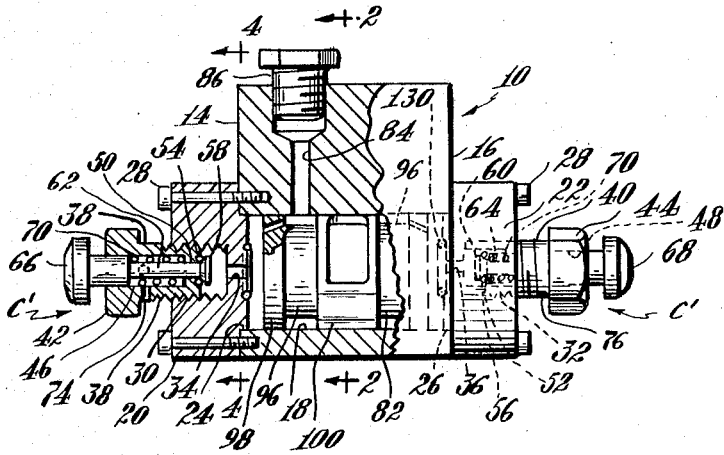
FIG. 1 is an elevation, partly in section, of the valve assembly.
Figure 2:
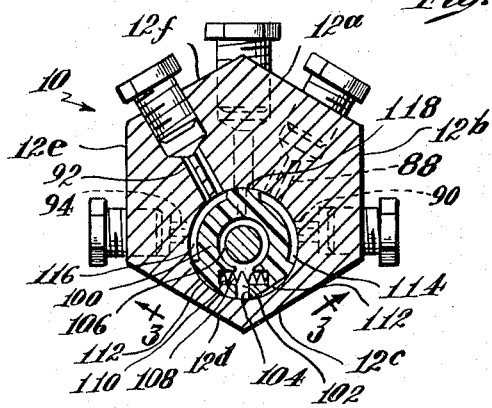
FIG. 2 is a vertical section taken on the line 2—2 of FIG. 1.
Figure 3:
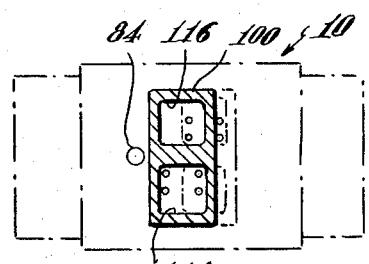
FIG. 3 is a partially developed view of a valve element showing the valve assembly in outline.

A spool 82 is mounted in the chamber 18 for free sliding movement lengthwise thereof and the body 10 has an inlet port 84 through its walls at the intersection of the side faces 12a and 12f, through which pressure fluid is permitted to enter the chamber 18 for the purpose of effecting movement of the spool, as will appear hereinafter. The outer end of the port 84 is enlarged and threaded and a threaded nipple 86 is screwed into it for connecting a conductor thereto. The port 84 enters the chamber 18 closer to the left end of the chamber than the right, as shown in FIG. 1, but is in such a position that even when the spool occupies the extreme right-hand position, the port will be in communication with the annular space between the flanges of the spool. There are two other pairs of ports 88, 90 and 92, 94, the ports of each pair being spaced arcuately relative to each other and axially relative to the inlet port 86. Each of the ports is provided with a nipple for connecting it to a conductor. As illustrated, the ports 88, 90 are located in the side faces 12a and 12b and the ports 92, 94 are located in the side faces 12e and 12f.

The spool or piston 82 has a smooth cylindrical intermediate portion 96 of smaller diameter than the chamber and enlarged end flanges 98—98 corresponding substantially in diameter to the chamber and which fit loosely the wall of the chamber. The ends, that is, the outer faces of the flanges, are ground flat and in planes perpendicular to the longitudinal axis of the spool. Each flange contains one or more bleeder passages located close to its peripheral edge which may be inclined from the inner side toward the outer side.

A valve element in the form of a relatively short sleeve 100, containing a gap lengthwise of it, providing a slot 102 with spaced parallel facing walls 104—104, is mounted on the intermediate portion of the spool for movement therewith. To assure such movement of the sleeve with the spool, the intermediate portion contains a peripheral groove 106 corresponding in width to the sleeve within which the sleeve is seated. One or more springs 108 are disposed under compression in recesses 110—110 in the walls of the slot and operate to spread the sleeve thereby holding its peripheral surface in intimate and substantially pressure-tight engagement with the interior wall of the chamber 18. As disclosed in my copending application of even date, a circular spring ring may be mounted within the sleeve under compression to hold the latter expanded within the chamber. The slot 102 permits the pressure entering the inlet port to be in constant communication with the portions of the chamber at each side of the sleeve. Flats 112—112 are formed lengthwise of the sleeve at each side of the slot 102 to assist in obtaining a better fit and to lessen the bearing surface and hence to give greater mobility. In the peripheral wall of the sleeve at each side and symmetrically with respect to the slot 102, there are arcuate recesses 114, 116, the ends of which are spaced from each other at the one end by the flats 112—112 and at the other end by a shoulder 118. The recesses 114, 116 are so positioned and of such peripheral length as to connect, respectively, the pairs of ports when shifted to the right or left within the chamber. The ports 88, 90 are connected by the recess 114 when the spool is situated at the right end of the chamber and the ports 92, 94 are connected by the recess 116 when the spool is situated at the left end of the chamber. Rotation of the sleeve on the spool may be prevented by any suitable means.

The porting of the chamber and the valve sleeve described herein is only for the purpose of illustration, forming the subject matter of my copending application filed on even date, and in so far as the invention of the present application is concerned, may be replaced by a structure such as shown in FIG. 6, comprising a flat shoe 120 movable in a slot 122 in the wall of the chamber, in contact with a plate 124 secured to the wall, containing ports 126 connectable by shifting of the shoe. Movement of the shoe in this form is effected by a lug 129 secured to the spool intermediate its ends and to the shoe.

In accordance with the invention as herein illustrated, greater simplicity and dependability are provided by constructing the spool or piston 82 with perfectly flat smooth end faces perpendicular to the longitudinal axis of the spool and by constructing the inner ends of the chamber 18 with correspondingly smooth flat faces perpendicular to the longitudinal axis of the chamber which, as component parts of the valve, may be machined easily and quickly, and by mounting O-rings 128, 130 of elastically deformable material on the end faces of the cylinder surrounding the exhaust ports, or on the ends of the spool concentric with the axis thereof which are operative, when squeezed between the ends of the chamber and the ends of the spool, to seal the exhaust ports. As shown in FIGS. 4 and 5, the end faces of the chamber contain grooves 132, 134 concentric with the exhaust ports 34, 36 which are substantially half-circular in cross-section for receiving the O-rings. In FIG. 8 the groove 132 is shown formed in the end of the spool with the O-ring 128 seated therein. The groove 132 may be somewhat deeper than semicircular, with tangential cylindrical walls, in order to facilitate peening as described below. A corresponding groove and ring are provided at the opposite end of the spool but are not shown because they are identical. To enable seating of the O-rings in the grooves, a small hole $a$ is drilled in the end faces of the chamber or end faces of the spool at the inner side of each of the grooves (FIGS. 4, 5 and 8) to permit air trapped behind the O-rings, when they are forced into the grooves, to escape. The O-rings are retained in place by peening the inner edges of the grooves, as illustrated in FIG. 8 at $p$, so that the grooves are slightly narrower where the rings protrude from the surfaces than the cross-sectional diameters of the O-rings. Preferably the O-rings are comprised of an elastomer such as neoprene which will compress sufficiently at 5 p.s.i. to provide a good seal and yet will withstand pressures at least as high as 150 p.s.i. without collapse.

As thus constructed and assuming that the valve assembly is connected by way of the nipple 86 to a source of pressure above atmospheric and that both of the closures C′, C″ are in their closed position, the pressure delivered through the ports 84 to the interior of the chamber 18 will enter the annular space surrounding the spool 82 between the end flanges 98—98 and if the spool is in a position such that neither end is engaged with an end of the chamber, the same pressure will exist between the outer ends of the spool and the ends of the chamber so that the spool will not move in either direction. If now the left-hand closure is unseated by pressure applied to the button 66 to move the part 58 from its seat 54 and thus connect the left-hand end of the chamber by way of the exhaust ports 34 and 74 to the atmosphere, the sudden rush of the pressure away from the left end of the spool to the atmosphere will unbalance the pressure at opposite ends of the spool so as to shift the spool toward the end from which the pressure is being exhausted, that is, toward the left end. Engagement of the O-ring 128 between the end of the cylinder and the spool, whether the ring is on the end wall of the chamber or the end of the spool, forms a seal at this end, closing the exhaust ports 34, 74 so that even though the button 66 is held displaced no further pressure can escape from this end. The bleeder passages help to accelerate movement of the spool toward the end from which pressure is being exhausted. The valve spool 82 will remain in this position regardless of what is done with respect to the button 66 at the left-hand end until the pressure is unbalanced by permitting escape from the right-hand end through the exhaust ports 36 and 76 at the right-hand end. This is achieved only by pressing the button 68 at the right-hand end toward the left so as to unseat the part 60 from the seat 56. As explained previously, the spool will thus shift to the right, engage the sealing ring 130 at the right end between the end of the spool and the end of the chamber thus cutting off further exhaust from this end, and will remain in this position regardless of any further manipulation of the button 68 until the button 66 at the left end is again displaced.

Displacement of the spool 82 carries with it the sleeve 100 containing the arcuate recesses 114, 116 which, as previously pointed out, are so located that when the spool is shifted to the left, one of the recesses connects the ports 88, 90 and when shifted to the right the other connects the ports 92, 94. If the valve assembly embodies the shoe 120, referred to above, this would be shifted in the same way as the sleeve.

The valve assembly, as thus described, is extremely simple to machine, assemble and maintain; is dependable; does not require securing or releasing of its actuating components to maintain the condition established by such actuation; and operates satisfactorily at pressures of 5 to 150 p.s.i.

The term "fluid" is used herein to denote liquids or gases and hence to cover use of the assembly for the control of hydraulically or pneumatically operated mechanisms or systems.

It should be understood that the present disclosure is for the purpose of illustration only and that this invention includes all modifications and equivalents which fall within the scope of the appended claim.

I claim:

In a valve assembly, the combination with a valve element movable selectively to connect spaced ports of the assembly, of a piston for shifting the valve element, of an elongate chamber within which the piston is freely slidable, said chamber containing a port intermediate its ends through which pressure is supplied to the chamber, of exhaust ports at the ends of the chamber through which the pressure within the chamber may be relieved, and of closure means in said exaust ports for unbalancing the pressure at the ends sufficiently to shift the piston toward the end from which the pressure is exhausted, characterized by:

uniformly flat ends of the piston,
correspondingly uniformly flat ends of the chamber,
elastically deformable O-rings compressible between the ends of the chamber and the ends of the piston to close the exhaust ports, the O-rings resting in substantially half-circular grooves formed in one of said ends concentric with the exhaust ports, and
a vent hole formed at one side of each groove extending from the flat outer face of the end of the bottom of the groove.

References Cited by the Examiner

UNITED STATES PATENTS

| | | |
|---|---|---|
| 874,652 | 12/1907 | Bailey. |
| 1,791,613 | 2/1931 | Clay _____ 251—31 |
| 2,524,951 | 10/1950 | Ashton. |
| 2,616,449 | 11/1952 | Maha _____ 251—31 X |
| 2,642,261 | 6/1953 | Gates _____ 251—322 |
| 2,678,187 | 5/1954 | Peters _____ 251—357 |
| 3,004,557 | 10/1961 | Wiegers _____ 251—31 X |

M. CARY NELSON, *Primary Examiner.*

E. K. FEIN, *Assistant Examiner.*